E. B. Manning.

Coffee Pot.

No. 2,013. Reissued Jun. 27, 1865.

Witnesses.
S. D. Law
Howard Bird

Inventor
E. B. Manning

THE NORRIS PETERS CO., WASHINGTON, D. C.

UNITED STATES PATENT OFFICE.

EDWARD B. MANNING, OF CROMWELL, CONNECTICUT.

IMPROVEMENT IN TEA AND COFFEE POTS.

Specification forming part of Letters Patent No. 35,457, dated June 3, 1862; Reissue No. 2,013, dated June 27, 1865.

*To all whom it may concern:*

Be it known that I, EDWARD B. MANNING, of Cromwell, in the county of Middlesex and State of Connecticut, have invented a new and useful Improvement in Tea and Coffee Pots; and I do hereby declare the following, when taken in connection with the accompanying drawings, and the letters of reference marked thereon, to be a full, clear, and exact description of the same, and which said drawings constitute part of this specification, and represent, in—

Figure 1:
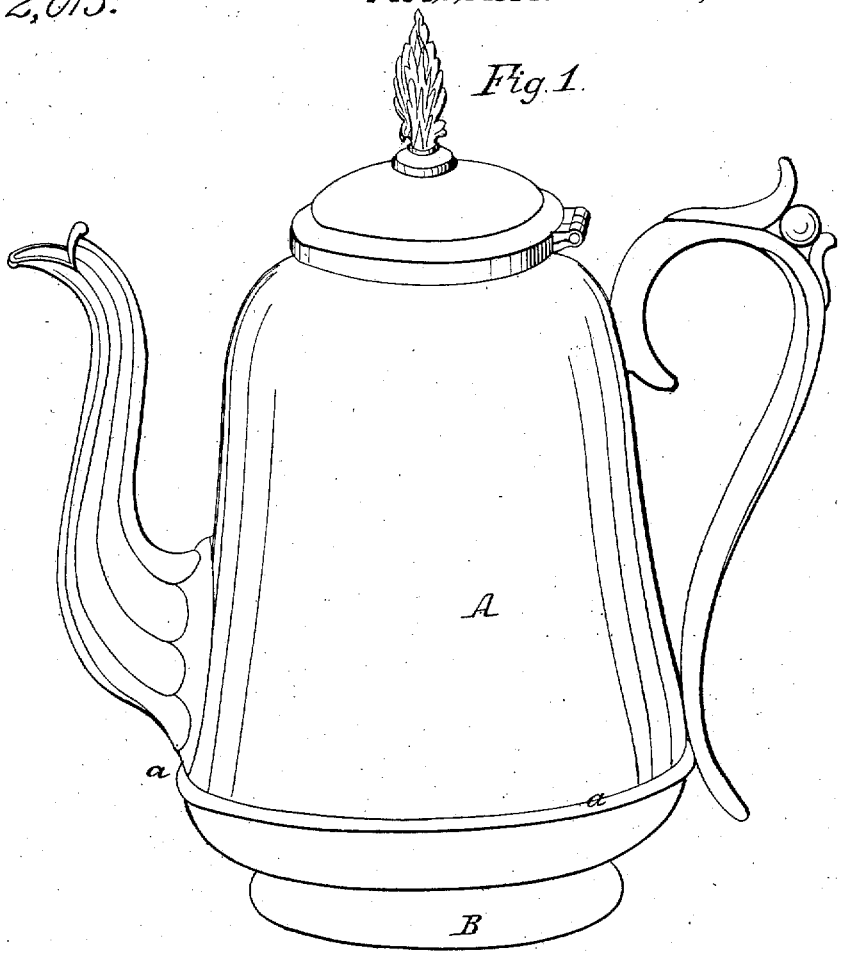
Figure 2:
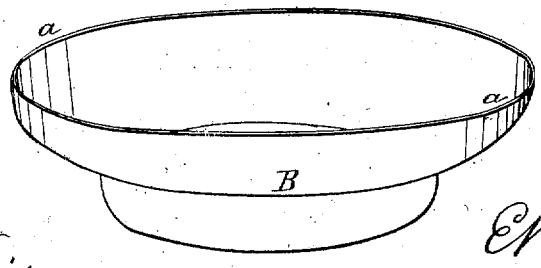

Figure 1, a perspective view, and in Fig. 2 the bottom and lower portion, of the body as formed to be united with the upper portion of the body.

Britannia metal, as is well known, is one of the cheapest and at the same time one of the most beautiful metals for the construction of tea and coffee pots, as its ductility permits its easy formation to any required shape, and at the same time is capable of receiving a high polish, but from its liability to fuse at a low degree of heat and from its inability to withstand the required pressure, it is not adapted to uses where necessarily brought into contact with highly-heated surfaces, as in the construction of tea or coffee pots, which are generally placed upon a highly-heated stove or range for the purpose of drawing or boiling tea or coffee. Other metals capable of sustaining a greater heat and pressure—as block-tin, &c.—less beautiful in appearance, have, therefore, to a very considerable extent been used for such purposes.

My invention, designed to overcome these difficulties, consists in constructing the bottom and lower part of the body of tea or coffee pots from a metal fusible only at a high degree of heat and capable of withstanding a great pressure, and the upper part of the body from britannia, and uniting the two parts so that the bottom may be flat and placed directly upon a heated surface—as upon a range or stove—without injury to any part of the tea or coffee pot.

To enable others skilled in the art to construct my improved tea or coffee pot, I will proceed to fully describe the same as illustrated in the accompanying drawings.

The upper part, A, of the body is made of britannia, and may be of any desired form into which the metal is capable of being wrought. The lower part, B, of the body is of iron or any other metal capable of sustaining a high degree of heat and pressure without injury, and is struck up to correspond with the form of the upper part of the body. The part B may be tinned and polished so as to be rendered nearly as smooth, bright, and elegant in its appearance as britannia itself, and then the whole vessel will harmonize as if made of the same metal. The lower part, B, of the body is united to the upper or britannia part, A, of the body at or near the upper edge, *a*, of the part B, which is some distance above the bottom, or far enough to prevent injury to the joint or upper part of the body when the vessel is placed upon highly-heated surfaces—as a stove or range—for the purpose of steeping or drawing tea, &c.

In all the attempts that have heretofore been made to prevent britannia coffee and tea pots from being injuriously affected by the heat by combining some other metal with them, such result has been sought to be obtained either by the use of feet or a ring or ledge placed under the vessel, or by making the bottom surface of copper, brass, or similar metal. In the former cases, when feet or a ring or ledge are used, the bottom of the coffee or tea pot is raised above the range or stove. This interferes with the quick and proper action of steeping or boiling in such vessels.

When the bottom surfaces of such articles have been made of firmer metal, the joint between the two different kinds of metal has been, in order to preserve the beauty and artistic appearance of the pot, either directly on the edges of the bottom or just above it, so that the heated surface of the stove, &c., would act directly on such joint to unsolder it or melt the britannia body, or would be so near such joint as to produce the same effect of rendering the vessel leaky and useless. All such combinations have either raised the vessel from the heating surface, thereby rendering the vessels less adapted for the purposes for which intended, or the attached bottom has been extremely liable, if not certain, to become unsoldered and leaky whenever the pot was applied to its appropriate uses.

By my improved form of construction and of combining the firmer metal with the britannia, the bottom of the vessel can be made and left flat, so as to come in close contact with the range, &c., thereby causing the operation of steeping, &c., to be quickest, and in the preparation of tea and coffee the quickness with which the strength is drawn from the substance is very important and essential to the goodness of the decoction produced, and all danger or liability of the joint being loosened and the vessel rendered leaky is effectually prevented and obviated.

By heavily trimming the lower part of the vessel and polishing the same I also produce a vessel of as neat and elegant appearance as if made entirely of britannia, but at the same time having all proper resistance to heat and pressure where such resistance is necessary.

Thus my invention or improvement does not consist in simply combining with or uniting to britannia metal another metal which will bear a greater degree of heat, but in constructing the lower and bottom part of the pot from such other metal, by swaging or otherwise, into any desired artistic shape corresponding with the shape of the britannia metal, and in uniting the two metals by placing the joint or place of connection between the two so far above the bottom surface that while said bottom surface may be flat and in direct contact with the heating-surface, neither such joint nor the britannia metal will be injuriously affected by heat.

I do not claim the forming of pots and vessels of different kinds of metal, as this has been before done; but

What I claim as my invention, and desire to secure by Letters Patent, is—

The herein described tea or coffee pot, in which the bottom and lower portion of the body is constructed of hard metal—as iron united to a britannia body, in the manner described—when the said hard-metal bottom and body are formed in the manner described and united to the britannia body a sufficient distance from the bottom to protect the britannia from the effects of heat or other injury, as and for the purpose specified.

EDWARD B. MANNING.

Witnesses:

JNO. S. BEACH,

JOHN E. EARL.